United States Patent [19]
Herbst

[11] Patent Number: 5,425,905
[45] Date of Patent: Jun. 20, 1995

[54] METHOD OF OPERATING AN INJECTION-MOLDING MACHINE WITH MOLD-PROTECTING DEVICE

[76] Inventor: Richard Herbst, Freisinger Strasse 3 b, D-8057 Eching, Germany

[21] Appl. No.: 77,024

[22] Filed: Jun. 15, 1993

[30] Foreign Application Priority Data

Jun. 16, 1992 [DE] Germany .................. 42 19 687.6

[51] Int. Cl.⁶ .................. B29C 45/64; B29C 45/84
[52] U.S. Cl. .................. 264/39; 264/40.5; 425/138; 425/150; 425/590
[58] Field of Search .................. 264/39, 40.1, 40.5; 425/136, 135, 150, 154, 162, 138, 167, 590

[56] References Cited

U.S. PATENT DOCUMENTS

| | | | |
|---|---|---|---|
| 3,564,657 | 2/1971 | Aoki | 425/154 |
| 4,131,596 | 12/1978 | Allen | 264/40.5 |
| 4,696,632 | 9/1987 | Inaba | 264/40.5 |
| 5,034,168 | 7/1991 | Matsumoto et al. | 264/39 |

FOREIGN PATENT DOCUMENTS

| | | | |
|---|---|---|---|
| 096183 | 12/1983 | European Pat. Off. | 425/154 |
| 2421364 | 11/1974 | Germany | 425/150 |
| 3032407 | 3/1982 | Germany . | |
| 3631164 | 6/1987 | Germany . | |
| 289736 | 5/1991 | Germany | 425/150 |
| 60-58826 | 4/1985 | Japan . | |
| 2-98419 | 4/1990 | Japan | 425/136 |

*Primary Examiner*—Mathieu D. Vargot
*Attorney, Agent, or Firm*—Kokjer, Kircher, Bowman & Johnson

[57] ABSTRACT

In the case of an injection-molding machine with mold-protecting device, every time the machine is started up a predetermined number N of injection-molding cycles are run at a greatly reduced machine speed in order to allow the mold-protecting device to be operated with increased sensitiveness during these cycles. If no trouble occurs during the said N cycles, the machine speed is increased to operating speed, either abruptly or continuously, and the mold-protecting device is either switched off or operated thereafter with adapted sensitivity.

8 Claims, 1 Drawing Sheet

METHOD OF OPERATING AN INJECTION-MOLDING MACHINE WITH MOLD-PROTECTING DEVICE

BACKGROUND OF THE INVENTION

1. Field of the Invention

The present invention relates to a method of operating an injection-molding machine with mold-protecting device which, for the purpose of protecting the mold, comprises the steps of driving the movable mold part of the injection-molding machine at a reduced speed and/or reduced pressure during the final phase of the closing travel, detecting the arrival of the mold at a predetermined final position ($S_2$), and providing a trouble signal when the predetermined position is not reached, or not reached within a predetermined time interval, and in the presence of this trouble signal preventing any clamping pressure from being applied to the mold.

2. Description of the Related Art

There has been known from DE-OS 30 32 407 a device for controlling the closing speed of the movable mold mounting plate of an injection-molding machine. In the case of this known device, the closing speed of the movable mold mounting plate, as a first measuring signal, is compared by a comparator arrangement with a reference voltage associated with the plate distance, as a second measuring signal. When a predetermined differential value, different from zero, is reached, a correction signal is generated for a control circuit in order to reduce the closing speed of the movable mold mounting plate for a remaining short closing travel. To this end, one correspondingly reduces for example the operating pressure for the mold mounting plate.

DE-OS 36 31 164 describes a method and a device for measuring and controlling the clamping pressure of a plastic injection-molding machine. In this case, the clamping pressure is measured, with the mold in locked condition, during a predetermined number of operating cycles of the injection-molding machine. One then derives an average value from the measurements so obtained. If the average value is within a predetermined tolerance zone, the control will not interfere. On the other hand, if the average value is outside the tolerance zone, within a control zone defined by alarm limits, the control interferes by varying step by step the mounting height of the mold and, thus, the clamping force for the subsequent operating cycle. The known method may be employed either during the starting-up phase of the injection-molding machine or (once the thermal equilibrium has been reached) during the normal operating phase.

JP-A-60 58826 describes a device for varying the injection conditions of an injection-molding machine. In the case of this known injection-molding machine, different parameter sets are stored in a storage of the machine for different operating conditions of the machine. In addition, the machine is equipped with a counter that counts the number of injection cycles. When the machine is started up, a given numerical value is determined which corresponds to the number of injection cycles at the end of which the start-up phase of the machine is terminated. When starting-up the machine, the machine initially is operated with a first set of operating parameters, while at the same time the sensor signal is monitored and compared with the said predetermined number. Once the sensor signal, i.e. the number of injection cycles counted, corresponds to the predetermined number, the machine switches over to a different set of operating parameters so as to account for the thermal equilibrium now attained, the reduced viscosity of the plastic material, or the like.

It is general practice with injection-molding machines that the movable part of the mold is initially moved toward the stationary part of the mold at a predetermined pressure and speed, until the clamping position is reached, and is then, in the clamping position, subjected to a high clamping force exerted by a hydraulic pressure cylinder in order to ensure that the mold will remain closed even under the effect of the high pressure of the injected plastic material. While in many cases the clamping pressure is generated by a hydraulic pressure cylinder operating separately from the closing drive, it is also possible to provide a single hydraulic cylinder which drives the movable part of the mold at a progressively increasing force, for example via a toggle-lever mechanism, as is the case for example with the injection-molding machine according to the before-mentioned DE-OS 36 31 164.

If an obstacle is found between the mold parts during the closing movement, such as a foreign body or hardened plastic residues, then these may get jammed between the mold parts. If in such a case the clamping pressure is applied to the mold, this may cause damage to the parts of the mold, or may lead to the molten plastic material emerging from the mold during the subsequent injection process in case the mold does not get fully closed.

In order to overcome this risk, it has further been known to make use of what is known as "mold-protecting device" by means of which any interference with the closing movement can be detected. To this end, the speed of movement of the movable part of the mold and/or the pressure applied to the closing drive, are greatly reduced during a final phase of the closing travel in a manner known as such from the above-mentioned DE-OS 30 32 407.

When an obstacle is present in the path of the mold, then the mold is stopped, or at least decelerated, due to the lower pressure and/or the reduced speed. If in any such case a "mold-protecting device" is provided, then the system detects whether or not the mold has reached a predetermined final position. If the final position is not reached, or is not reached within a predetermined time interval, then a trouble signal is released which prevents the mold from being subjected to the clamping pressure.

Modern injection-molding machines are designed for high cycle speeds. The time available for the entire closing travel is very short, in the range of only 0.5 seconds. Within this time interval, only a very short period of time can be reserved for the mold-protecting phase, during which the speed of the mold is reduced, since otherwise the whole duration of the closing travel would be undesirably extended. However, a short time interval of, say, only 1/10 seconds or less permits the mold-protecting device to be operated only with a relatively coarse and insensitive setting, so that given the existing forces of inertia damage to the mold cannot be safely avoided, even if the mold-protecting device actually responds. If the mold-protecting device is operated with reduced pressure, instead of reduced speed, the time loss in fact is largely avoided; but the sensitivity is poor in this case, and the risk of damage to the mold is correspondingly great.

In the case of the device known from the before-mentioned DE-OS 30 32 407, one only controls the closing speed of the mold and brakes it in the final phase of the closing travel.

In the case of the device known from DE-OS 36 31 164, any trouble occurring will be detected by monitoring the clamping force, and in addition such monitoring is extended over a given period of time, by an averaging process. But systematic conclusions are never derived, especially not when no trouble was detected by the averaging process during the time interval.

In the case of the device known from JP-A-60-58826, the machine is switched over after a predetermined number of injection cycles from a first operating mode to a second mode with different operating parameters, and this irrespective of the existence or absence of any trouble.

This is because in the case of the known devices either no trouble detection is provided, or trouble detection is repeated at regular intervals, which latter process results in corresponding time losses.

SUMMARY OF THE INVENTION

Starting out from this state of the prior art, it is the object of the present invention to improve a method of the before-mentioned type in such a way as to provide a mold-protecting device which can be adjusted more sensitively and which will respond reliably, while the production speed remains substantially unaffected or may even be increased, compared with the state of the prior art.

The present invention achieves this object by the fact that during the start-up phase the machine is operated for a predetermined number N of injection cycles at a speed corresponding to a fraction of the full operating speed of the machine, that during each of these N cycles the mold-protecting process is carried out for each closing movement, and that the machine speed is increased to operating speed only if the trouble signal does not occur during the N cycles.

Thus, the invention is based on the principle that during each start-up phase of the machine, the first N injection cycles are run at greatly reduced speed, merely for purposes of the mold-securing process. The speed may, for example, be as low as 10 or 20% of the final operating speed of the machine. During this period of time, any trouble occurring during the closing movement of the mold can be detected very sensitively.

Experience shows that by far the greatest part of all trouble conditions occur during the start-up phase of the machine. If no trouble signal is generated by the mold-protecting device during the first N injection cycles, which according to the invention are run at reduced speed, it can be assumed with a high degree of probability that no trouble will occur during further operation.

Consequently, the mold-protecting device either can be switched off after the first N cycles, or can remain operative for the whole operating time during which the machine is operated at normal speed. In this latter case, however, the sensitivity is no longer the same as during the first N cycles, due to the full cycle speed.

The machine may be equipped with an automatic control causing the machine to be operated at reduced speed for the first N cycles, every time the machine is started up, and if no trouble signal occurs to be speeded up to full operating speed, either abruptly or at a predetermined acceleration rate.

BRIEF DESCRIPTION OF THE DRAWINGS

The invention will now be described in more detail by reference to the drawings, in which.

DETAILED DESCRIPTION OF THE INVENTION

Figure 1:
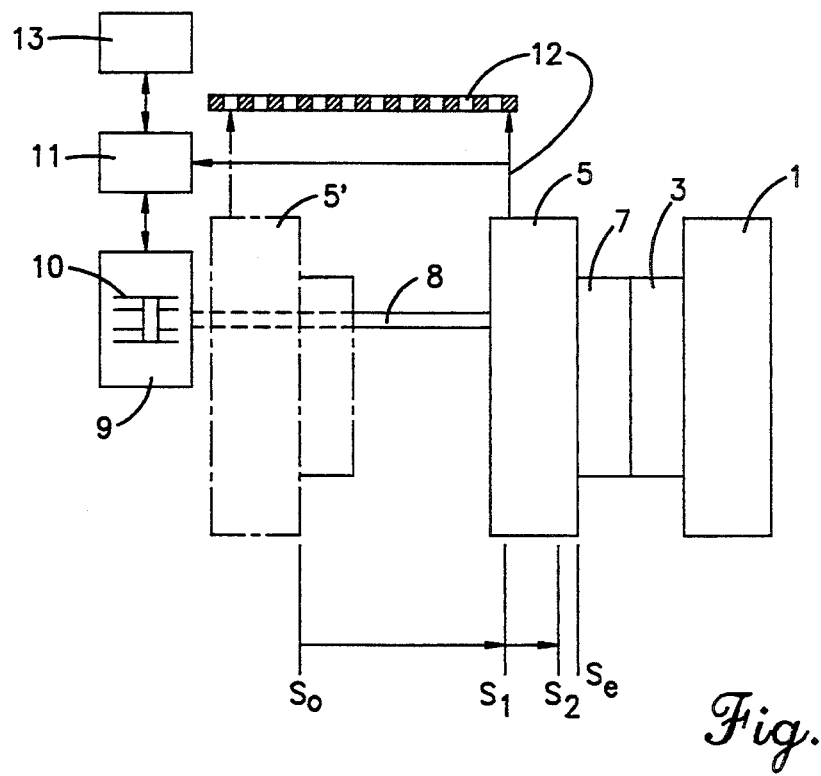
FIG. 1 shows a diagrammatic view of the mold of an injection-molding machine, in the open and closed positions.

The diagrammatic representation of FIG. 1 shows the stationary mold mounting plate 1 with the stationary part of the mold 3, and the movable mold mounting plate 5 with the movable part of the mold 7 of an injection-molding machine. The movable mold mounting plate 5 with mold part 7 can be moved between the open position 5', indicated by dash-dotted lines, and the closed position 5 by means of an opening and closing drive (not shown), normally a hydraulic drive. In the closed position 5 a clamping force can be applied to the mold mounting plate by a hydraulic clamping cylinder (not shown in the drawing). The invention is of course useful also in connection with other drive mechanisms, such as one using a toggle-lever mechanism.

Figure 2:
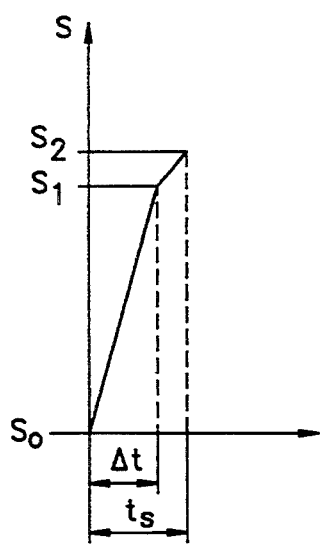
FIGS. 2 and 3 show predetermined displacement travel versus time diagrams for the machine of FIG. 1 for a machine speed approximately equal to full operational speed and for a reduced speed, respectively.

From a first operational position being the opening position $S_o$, over the largest part of the closing travel, up to a predetermined first intermediate position $S_1$, the closing movement of the mold mounting plate 5 according to FIG. 2 is carried out at the full operational speed of the closing drive. In view of the above-mentioned 0.5s closing time for a standard mold, the term "full operational speed" may therefore mean speeds on the order of 0.2 m/s. In the final phase of the closing travel, i.e. after the first intermediate position $S_1$ has been passed, the closing speed is lowered to a value significantly lower than the full operational speed and the system detects if and when a second intermediate position $S_2$ is reached.

The second intermediate position $S_2$ may be identical with the fully closed position $S_e$, although preferably $S_2$ lies a short way ahead of the closed position $S_e$. If the second intermediate position $S_2$ is not reached, or not reached within a predetermined time interval, then this is an indication of some trouble in the closing process, caused for example by a foreign body present in the mold. In this case, the closing drive of the mold mounting plate 5 is switched off, and in particular any application of the closing force is prevented, whereby any damage to the expensive parts of the mold is excluded.

FIG. 2 shows that when the machine is running at full operational speed, in which case only the time $t_s$ is available for the entire closing travel, the time interval $\Delta t$, during which the mold-protecting device is active, is extremely short so that it cannot be guaranteed that the mold-protecting device will respond with sufficient sensitivity and accuracy.

Figure 3:
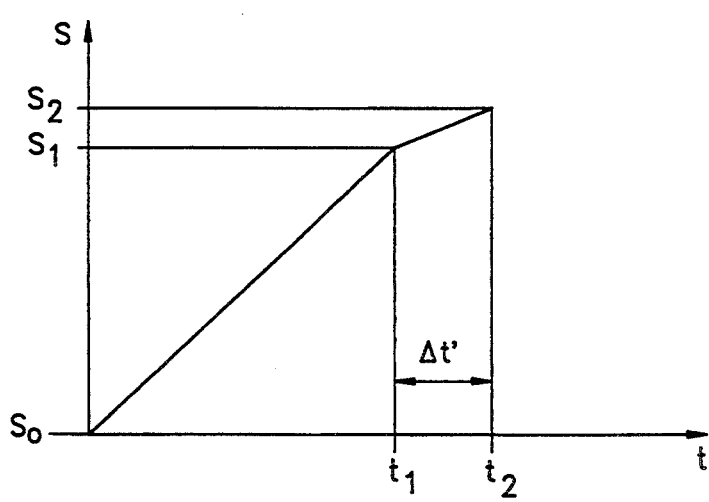

If, however, during the starting-up phase of the machine, the machine is operated—according to FIG. 3—at a reduced speed between $S_0$ and $S_1$, for example at a speed equalling only 20% of the full operational speed according to FIG. 2, during the first N cycles, for example during five cycles, then the time available for the entire travel from $S_0$ to $S_2$ is correspondingly longer. The time interval $\Delta t'$ between $S_1$ and $S_2$ available for the mold-protecting device is correspondingly longer, too. The mold mounting plate 5 moves at the reduced speed until the first intermediate position $S_1$ and then moves at a still further reduced speed from the first intermediate position $S_1$ to the second intermediate position $S_2$. The distance between $S_1$ and $S_2$ is passed during the time interval $\Delta t'$ so that it can be detected very precisely whether or not the path between the positions $S_1$ and $S_2$ is run through within a predetermined time interval $\Delta t'$. If a foreign body is present between the mold parts 3, 7, then the movable part of the mold is stopped or decelerated, and as a result thereof a trouble signal is released.

The various speeds, i.e. the full operational speed and lowered speed according to FIG. 2 or the reduced speed and the further reduced speed according to FIG. 3 may be set by appropriately setting the pressure in the movable mold displacement cylinder. FIG. 1, more specifically, shows the various elements, needed for performing the closing and the opening movement of movable mold mounting plate B and for controlling same.

8 designates an acutation bar connecting movable mold mounting plate 5 with a hydraulic drive vice 9 in which, for illustration purposes, a piston-and-cylinder unit is designated at 10. Hydraulic drive untit 9, in turn, controlled by a control device 11, as known per Movable mold mounting plate 5, further, is connected with a position sensor as indicated at 12. Position sensor 12 is connected to control device 11 so as to enable control device 11 to make a closed-loop control of displacement of movable mold mounting plate 5.

Further, an error or trouble signal generator 13 is provided cooperating with control device 11. Error signal generator 13 continuously watches displacement of movable mold mounting plate 5 in order to observe whether or not movable mold mounting plate 5 follows a predetermined path of displacement, as stored in control device 11.

As soon as error signal generator 13 detects that movable mold mounting plate 5 is not at its predetermined position during its course of travel, error signal generator 13 will generate an error signal preventing further displacement of movable mold mounting plate 5 by appropriately influencing control device 11.

I claim:

1. A method of operating an injection-molding machine having
    a first, stationary mold portion;
    a second, movable mold portion;
    drive means for displacing said second mold portion by means of hydraulic pressure with respect to said first mold portion between a first operational position with the first mold portion being distant from said second mold portion and a second operational position with said first and said second mold portions adjoining each other;
    position sensor means arranged to cooperate with said second mold portion for detecting an actual relative position of said second mold portion with respect to said first mold portion;
    control means for controlling said drive means to displace said second mold portion along predetermined positions of a predetermined path of displacement; and
    error signal generating means cooperating with said control means for generating an error signal in case said second mold portion actual relative position as detected by said position sensor means does not coincide with said predetermined position of said predetermined path of displacement, said error signal, when generated, preventing further displacement of said second mold portion;

said method comprising the steps of
    a) initiating a closing movement of said second mold portion from said first to said second operational position at a first speed of displacement until a first intermediate position ($S_1$) is reached, said first speed being set significantly lower than a standard operational speed of said second mold portion;
    b) continuing said closing movement at a second speed of displacement beyond said first intermediate position, said second speed being lower than said first speed;
    c) performing an injection-molding process on said injection-molding machine;
    d) opening said second mold portion from said second to said first operational position;
    e) repeating above steps a) through d) for a predetermined number (N) of times; and
    f) continuing with repeating above steps a) through d) beyond said predetermined number (N) of times when no error signal has been generated during step b) until completion of step e), with said first speed being increased to said standard operational speed.

2. The method of claim 1, wherein in step b) an error signal is generated in case said second mold portion does not reach a second intermediate position ($S_2$) beyond said first intermediate position ($S_1$) within a predetermined amount of time ($\Delta t'$).

3. The method of claim 2, wherein said predetermined amount of time ($\Delta t'$) is set according to said speeds of displacement.

4. The method of claim 2, wherein said second intermediate position ($S_2$) is said second operational position.

5. The method of claim 1, where during step f) said error signal generating means remains thoroughly deactivated.

6. The method of claim 1, wherein during step f) said first speed is continuously increased to said standard operational speed.

7. A method of operating an injection-molding machine having
    a first, stationary mold portion;
    a second, movable mold portion;
    drive means for displacing said mold portion by means of hydraulic pressure with respect to said first mold portion between a first operational position with the first mold portion being distant from said second mold position and a second operational position with said first and said second mold portions adjoining each other;
    position sensor means arranged to cooperate with said second mold portion for detecting an actual relative position of said second mold portion with respect to said first mold portion;
    control means for controlling said drive means to diplace said second mold portion along predetermined positions of a predetermined path of displacement; and
    error signal generating means cooperating with said control means for generating an error signal in case said second mold portion actual relative position as detected by said position sensor means does not coincide with said predetermined position of said predetermined path of displacement, said error signal, when generated, preventing further displacement of said second mold portion said method comprising the steps of
a) initiating a closing movement of said second mold portion from said first to said second operational position at a first hydraulic pressure until a first intermediate position ($S_1$) is reached, said first hyraulic pressure being set significantly lower than a standard operational hyraulic pressure of said second mold portion;
b) continuing said closing movement at a second hydraulic pressure beyond said first intermediate position, said second hydraulic pressure being lower than said first hydraulic pressure;
c) performing an injection-molding process on said injection-molding machine;
d) opening said second mold portion from said second to said first operational position;
e) repeating above steps a) through d) for a predetermined number (N) of times; and
f) continuing with repeating above steps a) through d) beyond said predetermined number (N) of times when no error signal has been generated during step b) until completion of step e), with said first hydraulic pressure being increased to said standard operational hydraulic pressure.

8. An injection-molding machine having
a first, stationary mold portion;
a second, movable mold portion;
drive means for displacing said second mold portion by means of hydraulic pressure with respect to said first mold portion between a first operational position with the first mold portion being distant from said second mold portion and a second operational position with said first and said second mold portions adjoining each other;
position sensor means arranged to cooperate with said second mold portion for detecting an actual relative position of said mold portion with respect to said first mold portion
control means for ling said drive means to diplace said second mold portion along predetermined positions of a predetermined path of displacement; and
error signal generating cooperating with said control means for generating an error signal in case said second mold portion actual relative position at detected by said position sensor means does not coincide with said predetermined position of said predetermined path of displacement, said error signal, when generated, preventing further displacement of said second mold portion;

said machine comprising further
a) means for initiating a closing movement of said second mold portion from said first to said second operational position at a first speed of displacement until a first intermediate position ($S_1$) is reached, said first speed being set significantly lower than a standard operational speed of said second mold portion;
b) means for continuing said closing movement at a second speed of displacement beyond said first intermediate position, said second speed being lower than said first speed;
c) means for performing an injection-molding process on said injection-molding machine;
d) means for opening said second mold portion from said second to said first operational position;
e) means for repeating above steps a) through d) for a predetermined number (N) of times; and
f) means for continuing with repeating above steps a) through d) beyond said predetermined number (N) of times when no error signal has been generated during step b) until completion of step e), with said first speed being increased to said standard operational speed.

* * * * *